United States Patent
Hodjat

(10) Patent No.: US 10,735,445 B2
(45) Date of Patent: Aug. 4, 2020

(54) DETECTING BEHAVIORAL ANOMALY IN MACHINE LEARNED RULE SETS

(71) Applicant: Cognizant Technology Solutions U.S. Corporation, College Station, TX (US)

(72) Inventor: Babak Hodjat, Dublin, CA (US)

(73) Assignee: Cognizant Technology Solutions U.S. Corporation, College Station, TX (US)

(*) Notice: Subject to any disclaimer, the term of this patent is extended or adjusted under 35 U.S.C. 154(b) by 183 days.

(21) Appl. No.: 15/710,732

(22) Filed: Sep. 20, 2017

(65) Prior Publication Data
US 2018/0083996 A1 Mar. 22, 2018

Related U.S. Application Data

(66) Substitute for application No. 62/397,863, filed on Sep. 21, 2016.

(51) Int. Cl.
| | | |
|---|---|---|
| *H04L 29/06* | (2006.01) | |
| *H04L 12/24* | (2006.01) | |
| *G06N 3/12* | (2006.01) | |
| *G06N 5/02* | (2006.01) | |
| *G06N 5/04* | (2006.01) | |

(52) U.S. Cl.
CPC ......... *H04L 63/1425* (2013.01); *G06N 3/126* (2013.01); *H04L 41/16* (2013.01); *G06N 5/025* (2013.01); *G06N 5/045* (2013.01)

(58) Field of Classification Search
CPC ........ G06N 3/08; G06N 20/00; G06N 3/0454; G06F 21/566; G06F 21/50; G06F 21/53; G06F 21/56; H04L 63/1425; H04L 63/145

See application file for complete search history.

(56) References Cited

U.S. PATENT DOCUMENTS

| | | | |
|---|---|---|---|
| 7,096,192 B1 | 8/2006 | Pettitt | |
| 8,909,570 B1 * | 12/2014 | Hodjat | G06N 3/126 706/13 |
| 9,367,816 B1 * | 6/2016 | Demaneuf | G06N 3/126 |
| 9,626,509 B1 * | 4/2017 | Khalid | G06F 21/53 |

(Continued)

OTHER PUBLICATIONS

Ryan J Urbanowicz, Introducing Rule-Based Machine Learning: Capturing Complexity, Jul. 2016, ACM, pp. 305-332. (Year: 2016).*

(Continued)

*Primary Examiner* — Luu T Pham
*Assistant Examiner* — Fahimeh Mohammadi
(74) *Attorney, Agent, or Firm* — Dawn-Marie Bey; Bey & Cotropia PLLC

(57) ABSTRACT

Roughly described, anomalous behavior of a machine-learned computer-implemented individual can be detected while operating in a production environment. A population of individuals is represented in a computer storage medium, each individual identifying actions to assert in dependence upon input data. As part of machine learning, the individuals are tested against samples of training data and the actions they assert are recorded in a behavior repository. The behavior of an individual is characterized from the observations recorded during training. In a production environment, the individuals are operated by applying production input data, and the production behavior of the individual is observed and compared to the behavior of the individual represented in the behavior repository. A determination is made from the comparison of whether the individual's production behavior during operation is anomalous.

12 Claims, 5 Drawing Sheets

(56) References Cited

U.S. PATENT DOCUMENTS

| | | | | |
|---|---|---|---|---|
| 2005/0267850 | A1* | 12/2005 | Chen | G06N 20/00 706/12 |
| 2006/0020924 | A1* | 1/2006 | Lo | G06F 11/0709 717/127 |
| 2012/0290516 | A1* | 11/2012 | Frank | G06F 3/013 706/12 |
| 2013/0174646 | A1* | 7/2013 | Martin | G01N 33/00 73/31.02 |
| 2014/0199664 | A1* | 7/2014 | Sadeh-Koniecpol | G09B 5/00 434/118 |
| 2014/0279762 | A1* | 9/2014 | Xaypanya | G06N 3/08 706/12 |
| 2015/0324586 | A1* | 11/2015 | Ghosh | G06F 21/56 726/23 |
| 2016/0092787 | A1* | 3/2016 | Gadde | G06N 5/02 706/12 |
| 2016/0300049 | A1* | 10/2016 | Guedalia | G06F 21/316 |
| 2016/0328715 | A1* | 11/2016 | Gideoni | H04L 67/22 |
| 2016/0337133 | A1* | 11/2016 | Yiu | H04L 9/3268 |
| 2017/0060963 | A1* | 3/2017 | Whittaker | G06N 20/00 |
| 2017/0061322 | A1* | 3/2017 | Chari | G06F 21/55 |

OTHER PUBLICATIONS

Kaustav Das et al., Anomaly Pattern Detection in Categorical Datasets, Aug. 2008, ACM, pp. 169-176. (Year: 2008).*

Leandros A. Maglaras et al., Intrusion Detection in SCADA systems using Machine Learning Techniques, Aug. 27-29, 2014, IEEE, pp. 626-631. (Year: 2014).*

Jiong Zhang et al., Random-Forests-Based Network Intrusion Detection Systems, Aug. 19, 2008, IEEE, vol. 38, Issue: 5, pp. 649-659. (Year: 2008).*

Hodge, V.J., et al., "A Survey of Outlier Detection Methodologies," Kluwer Academic Publishers, Printed in Netherlands, Copyright 2004, 45 pages.

Hooker, G., "Diagnostics and Extrapolation in Machine Learning," A Dissertation Submitted to the Dept of Statistics and Committee of Graduate Studies of Stanford University for Degree of PhD, Copyright 2004, 138 pages.

Thottan, M., et al., Anomaly Detection Approaches for Communication Networks, published in Algorithmns for Next Generation Networks, Springer-Verlag London Limited, Copyright Jan. 2010, 19 pages.

Wikipedia, "Network Behavior Anomaly Detection," last modified Nov. 3, 2016, retrieved online: <https://en.wikipedia.org/wiki/Network_Behavior_Anomaly_Detection> accessed on Nov. 25, 2016, 3 pages.

Viswanath, B., et al., "Towards Detecting Anomalous User Behavior in Online Social Networks," Proceedings of the 23rd USENIX Security Symposium, San Diego, CA, Aug. 20-22, 2014, 17 pages.

Not All Machine Learning Systems Are Created Equal, SiftScience. com, 6 pages, accessed Sep. 19, 2017 at https://blog.siftscience.com/2016/not-all-machine-learning-systems-are-created-equal/.

* cited by examiner

DETECTING BEHAVIORAL ANOMALY IN MACHINE LEARNED RULE SETS

CROSS-REFERENCE TO OTHER APPLICATIONS

This application claims priority to U.S. Provisional Application No. 62/397,863, filed Sep. 21, 2016, entitled "DETECTING BEHAVIORAL ANOMALY", which is incorporated by reference herein.

BACKGROUND

The invention generally relates to monitoring the behavior of rules responding to input data received within a production environment. More specifically, it relates to detecting when previously defined rules behave anomalously in a production setting. Typically but not always the rule sets are created through machine learning on training data.

In many environments, a large amount of data can be or has been collected which records experience over time within the environment. For example, a healthcare environment may record clinical data, diagnoses, and treatment regimens for a large number of patients, as well as outcomes. A business environment may record customer information such as who they are, what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

Existing anomalous behavior detection techniques require manually-created rules based on human observation of desirable or undesirable human behavior. There are at least two different kinds of behaviors to address: independent and contextual. Independent behaviors can be evaluated for normalcy independent of any other instances of behavior. In other words, no historical pattern is needed to determine whether the behavior is expected or unexpected, normal or abnormal. For example, detecting security breaches in a computer network may include looking for multiple login tries within a short period of time. Such behavior can be considered suspect without considering whether the user often mistypes their password. Another example is a credit card fraud detection system that may look for purchases of expensive jewelry on a credit card without considering the frequency with which the account holder buys jewelry.

Contextual behavior is evaluated for normalcy based on conformity to an established pattern of behavior. Each independent action is neither good (normal) nor bad (abnormal). Normalcy may be defined in terms of difference from an established pattern. For example, a credit card fraud system may use information about a card holder and purchase history to determine if a purchase is out of the ordinary for that card holder.

Existing systems that perform anomalous behavior detection evaluate the normalcy of human behavior. Usually, human behavior has intent and motive that can be anticipated. For example, a user in a computer network might conduct a denial of service attack, and a network security system would have hand-crafted rules to monitor network traffic patterns to detect such an attack. Attempting to detect and prevent undesirable behaviors usually involves manually crafted rules that encode conditions that have been observed in the past as correlated with the undesirable human behavior, such as a rule that flags a potentially fraudulent purchase when a point-of-sale (POS) purchase is made at a location more than a certain number of miles away from the home address. The rule may flag anomalous behavior when conditions are inconsistent, such as when two POS transactions occur within an amount of time that is less than how long it would take to travel from the first POS location to the other. Humans observe the correlation between certain data values in a credit card transaction and the likelihood of fraud, and humans encode these observations into rules for monitoring human behavior.

SUMMARY

Detecting anomalies in machine learned rule-based systems relies on automatically detecting behavior that is different from a recorded, automatically determined pattern of past behavior. For example, in a medical diagnosis system created by machine learning, the system may diagnose pneumonia in most patients having a persistent cough, and then unexpectedly diagnose lung cancer. The cancer diagnosis may be correct; the person displaying the symptoms may actually have lung cancer. However, the diagnosis may be suspect when it differs from past diagnoses. Such a suspicious diagnosis may be flagged for confirmation in some other way.

Detecting anomalous behavior in a computer-generated, machine-learned rule set is different than detecting anomalous human behavior. The rules of the machine-learned rule set may be randomly generated, permuted, tested on sample data, and selected for performance. A rule set's behavior is not predictable, and the rules are not handcrafted based on human observation. The rule sets have no intent or motivation. The resulting system itself may not do in production what is needed when the training data has not properly evolved the rule to handle the current production data. The rule set may be considered "out of its league" with respect to certain production data.

Automatically generating by a computer a machine-learned rule set relies on a process of extracting patterns from large amounts of data, known as data mining. Various machine learning techniques can be applied to the task. Examples of machine learning techniques include evolutionary algorithms of which genetic algorithms are a subset, artificial neural networks, Bayesian networks, deep learning, etc. Examples described herein use a genetic algorithm to evolve rule sets selected for use in a production environment based on performance when applied against sample training data.

A genetic algorithm is a way for evolving a solution to a problem using processes similar to evolution in nature. Similar to nature, such an algorithm uses a combination of selection, recombination and mutation to evolve a solution to a problem. Just as a natural being is represented by a set of chromosomes comprising genes, the kinds of solutions that are relevant to this disclosure may be represented by a set of individuals which contain or identify rule sets governing their operation.

An individual may comprise a set of rules, each rule having a set of conditions and an action. Thus, when an individual processes input data, the rules having conditions that are satisfied by the input data are said to fire or become activated. When a rule is activated, it may produce an output, such as perform an action, make a recommendation, or assert a consequence. As used herein, the term rule output is used to represent consequences of rules that fires. Multiple rules within the same individual may be activated by the same input data and their outputs combined to produce a single output for the individual.

One problem with production rule sets that were created and selected based on their behavior on sample training data is that production data is different than the test data, and rules that performed well on the sample data might not perform well under certain circumstances in production. Because there is no independent behavior to assess, it is difficult to know when the rule output can be trusted.

Using anomaly detection with machine learning focuses solely on identifying outputs of the trained rules, which do not conform to an expected pattern. The output may or may not be correct, but the system may, for various reasons such as misconfiguration or suboptimal training, still make decisions that deviate from its expected behavior, and therefore, appear to perform poorly. This is often somewhat subjective and not very easy to capture, especially in high-dimensional time-series data.

A known problem in all of artificial intelligence is that even with a machine learning system that was trained with some data and normally behaves well, there is no guarantee that the system behavior will always be correct. The system does not know when the system does not know the answer. There is no such rule output as, "I don't know. I shouldn't be working now because I'm out of my league."

The disclosed technique, roughly described, involves establishing a behavior baseline for individuals during the training process. The behavior baseline is established by characterizing the behavior of rule sets that were created by a machine learning system. The output of individuals during training may be stored, and this output in association with the input that caused the output is used in aggregation with outputs from applying other training data samples to characterize the individual's behavior. When an individual is moved into production, a comparison of the outputs on production data with the behavioral baseline is used to identify anomalous behavior. Identifying anomalous behavior allows remediation of the current behavior if needed, and prevention of future anomalous behavior. When the behavior in production is not anomalous, the current behavior in production may be added to the set of previously-seen behavior and may change the behavior baseline by being included in the aggregation.

In an embodiment of the invention, an individual comprises a set of evolved rules. The output of each rule in the individual's rule set may be combined to form the output of the entire individual.

In an embodiment of the invention, the behavior of each rule within an individual's rule set may be monitored and remediated independently from the other rules in the rule set. A behavior monitor receives the output from rule sets processing data in a production system along with the identity of the individual that processed the production data and generated the received output as well as the particular rule or rules of the individual that fired and contributed to the individual's output. If the order of the input data matters, the recorded data may include an indication of the sequence of input data points. For example, order may be represented by timestamp or sequence number. A rule's output may be recorded along with a characterization of the time at which the data was processed such as minute of the day, day of the week, month of the year, etc. The behavior monitor compares the current behavior to a baseline pattern of behavior. The difference between current and baseline behavior is quantified and compared against a threshold. When the behavioral difference is greater than the threshold, the associated rule is determined to be acting anomalously. Once identified, steps can be taken to address the anomaly, such as remove the rule, collect more detailed data and monitor future behavior of the particular rule more closely before deciding what to do, override the behavior such as blocking the output (or action based on the output) and rolling back state if appropriate, or any other appropriate action so as to not adversely affect the system being controlled.

An example application where this technique can be beneficial is one attempting to predict arterial blood pressure by learning from waveforms in the database. The waveforms comprise signals including multiple leads of electrocardiogram, arterial blood pressure, and pulmonary artery pressure. Data is selected for a subset of patients and thresholds are set based on the predictions the learned model makes on mean arterial pressure when running on the historical data.

The application domain determines what constitutes behavior. In trading, for example, behavior may be characterized as one of long, short, or no position for any particular minute of the day. Once behavior is characterized, the data needed to compute and aggregate statistics that represent behavior needs to be collected. To create a behavior baseline, rule output data may be captured and recorded while running the production rules over sample data. The statistics are created based on the captured data and stored for later comparison with the behavior in production. When the rules are run in production, much if not all of the same data is recorded as the rules are applied to production data. Output from rules applying production data may be added to the behavior baseline, if not determined to be anomalous.

Once behavior is characterized, any representation of the behavior model may be mapped to a distance model in a Cartesian world. A threshold may be established for the maximum allowable distance between production and baseline behavior. For example, two standard deviations is a good rule of thumb for a distance threshold. However, if the problem domain is well understood, a more precise threshold may be selected accordingly. The threshold also may reflect the cost of anomalous behavior. If acting on erroneous rule output would be very costly, the threshold may be more conservative.

When anomalous behavior is detected, the entire individual or a particular fired rule of the individual may be stopped or a number of pre-defined precautionary actions can be taken. For example, if the behavior involves stock trading, in one embodiment if anomalous behavior is detected then the individual (or rule) that caused the anomalous behavior may be disabled while other rules or individuals continue to operate. In another embodiment only the one anomalous action is suppressed, and the rule or individual is allowed to continue operating. In yet another embodiment, the system merely creates an alert—just to indicate an anomalous situation. For example, the anomalous situation may be written to an event log file, or an operator may be notified.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

Figure 1:
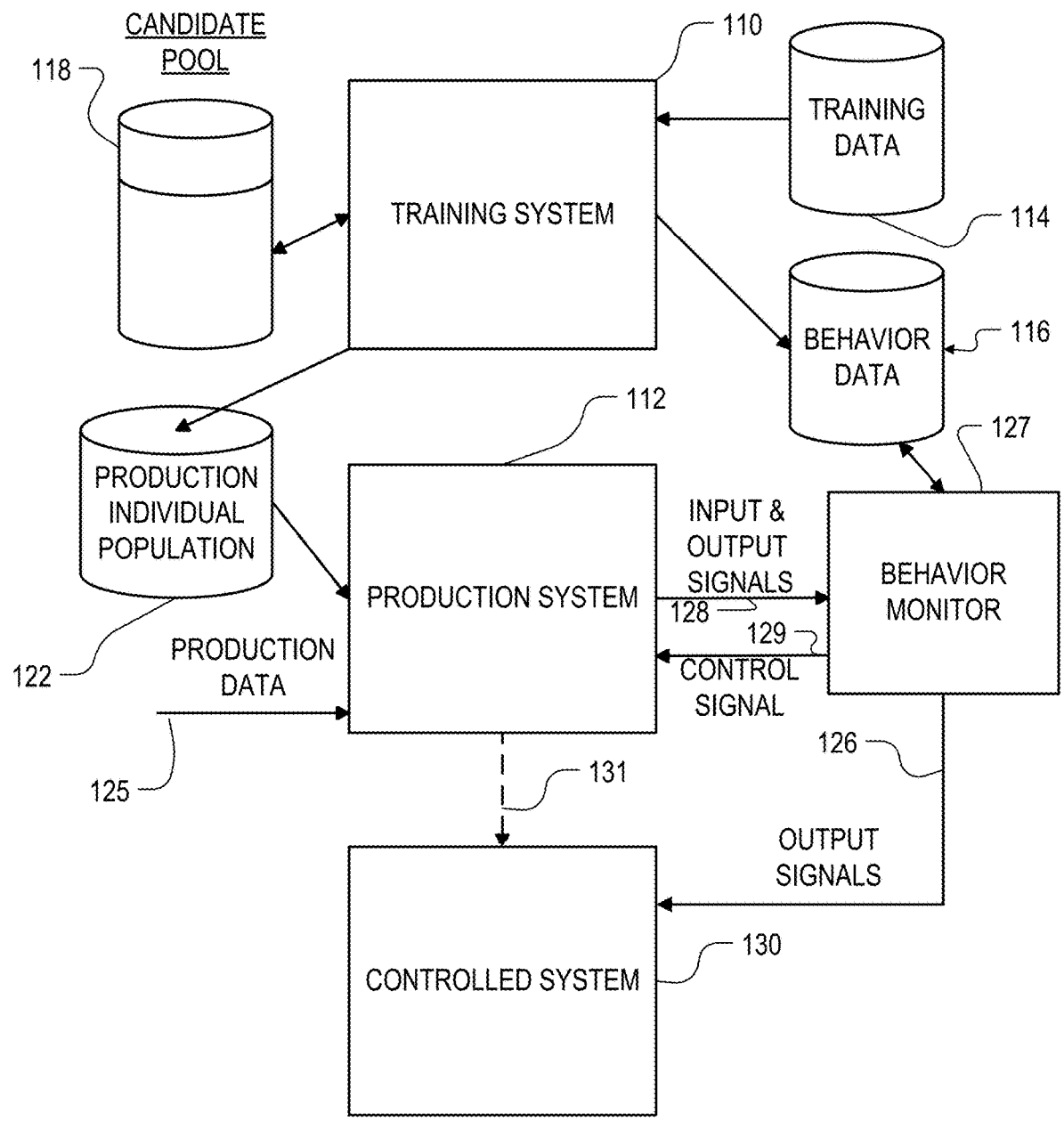
FIG. 1 illustrates components of a machine learning system, a production system into which machine trained rules are deployed, and a controlled system that receives and executes instructions output from the production rule set, according to an embodiment of the invention.

An individual's rule sets may be created and evolved in a machine learning system such as illustrated in FIG. 1. FIG. 1 illustrates components of a machine learning system including a training system 110, a production system 112 into which machine trained rules are deployed, and a controlled system 130 that receives and executes instructions output from the production rule set. Training data 114 stores historical data samples used to train the rules, including inputs and the resulting outputs. Candidate Pool 118 stores individuals in training, some of which will be discarded and some of which will be promoted into production and stored in production individual population 122.

At the beginning of a run of a genetic algorithm, an initial population of individuals is created and stored in candidate pool 118. They may be created randomly, or they may be initialized to meet some criteria of the solution to the problem. The training system 110 may create the initial population of individuals or the training system may receive the initial population form an external source. An individual may be represented by a numerical value or as a collection of rules, each rule having a set of conditions and an output. In an embodiment, a mapping may be used to translate between a numerical representation and a rule set representation. In that way operations on an individual may be performed on the representation of the individual that is most convenient for the operation. If an initial population is created by generating random numbers, the individual's rule set may be determined from mapping the numerical representation to the rule set representations. If an individual's rule set is generated to meet some criteria, its numeric representation may be derived from the generated rule set using the mapping.

Each individual may be a partial solution to the problem at hand. The following steps are repeated until a solution is found:

Each individual is tested and assigned a fitness score that indicates how good the individual is at solving the problem. To do this, input training data is applied to an individual's rule set and the output from the rule set is compared to the observed result corresponding to the input training data. "Applying" input data means that the rule conditions in an individual's rule set are evaluated using values from the input data. In some embodiments the fitness score is determined by comparing the output of the individual's rule set when evaluating the conditions on the training input data with corresponding observed output in the training data. Using a rule-set representation may be convenient for performing this step. For example, if the individual for a medical diagnosis system, the fitness score may be a measure of the accuracy of the diagnosis made by the rule set on a particular set of symptoms, as compared to the actual diagnosis in the training data. In another embodiment the fitness score may be determined from an absolute calculation involving the individual's asserted actions. For example, if the individual's rules define an algorithm for a robot to cross a room containing obstacles, the fitness can be taken as an inverse of the time required to cross the room.

Pairs of individuals from the current population are selected as parents for procreation. Survival of the fittest suggests that the selected parents should have assigned fitness scores among the top of the current population. It may be convenient to perform procreation using a numerical representation of the selected parents. Procreation includes crossover and mutation for each selected pair of parents. Crossover is performed by splitting the number representing a parent into two portions at the same bit position and creating a first child by combining the first portion of the first parent and the second portion of the second parent. A second child may be created by combining the first portion of the second parent with the second portion of the first parent. Occasionally (i.e. at random) a bit in the numerical representation is flipped to create a mutation. That is, the number representing an individual expressed in binary may be changed by changing the value of one bit from 1 to 0 or 0 to 1. A new number is created, and the new number represents a new individual with different characteristics.

Individuals with lower fitness scores may be removed from the population to keep the size of the population stable and to remove unfit characteristics from the candidate pool.

The training process is then repeated until some criteria are met, where the criteria is established based on the problem to be solved. For example, individuals may be selected as a member of the problem solution when they achieve a fitness score above a certain threshold value. Alternatively, an entire population may be selected as the problem solution when no new individuals are created with a sufficient fitness score (the solution converges) or when time to run the algorithm runs out.

When the genetic algorithm terminates, the individuals that have been selected for the problem solution, or those that have survived (that is, are still in the population), together comprise the solution to the problem. Individuals selected for the problem solution may be moved into the Production Individual Population 122.

Production system 112 executes the rule sets promoted into production. In an embodiment, the input data and output of each rule of each individual may be recorded during the training process. Data recorded during training for discarded individuals may be discarded. Upon being promoted into production, the data recorded for each of the rules in the rule set may be aggregated and stored as the Behavior Data 116 that establishes a behavioral baseline for the promoted individuals. Alternatively, the behavior of the individuals promoted into production is not stored at the time the individuals are being trained, but rather, the promotion process may establish a behavior baseline by applying the same training data 114 or another set of training data (not illustrated) to the newly promoted individuals. In either case, the baseline behavior data is stored in behavior database 116.

Production system 112 receives and processes production data 125. In some cases, the production data will be live, real-time data. In other cases, the data may have been captured earlier and replayed at a later time. When an individual's rule set is activated by incoming production data (input data that meets all of the required conditions of at least one of the rules in the rule set), the input data and the output signals 128 may be sent to Behavior Monitor 127. The behavior monitor 127 aggregates the data according to the behavior model and compares the behavior to the corresponding aggregation/statistics stored in the baseline behavior data 116. In an embodiment, if the behavior is considered within range of the baseline data, the output signals may be added to behavior data 116 where the current rule output will affect the characterization of normal behavior. Also, the output signals may be sent to the controlled system 130 that may perform an action based on the received output signal. Depending on the application environment, the controlled system 130 may also include mechanical systems such as engines, air-conditioners, refrigerators, electric motors, electric generators, robots, milling equipment, construction equipment, or a manufacturing plant.

In an alternate embodiment, when the observed behavior is considered to be within the normal range, the behavior monitor 127 may send a control signal 129 to production system 112 that causes the production system to send the output signals 128 directly to the controlled system 130 by way of optional path 131. In such an embodiment, the behavior monitor 127 need not communicate directly with the controlled system.

If the output signals are determined to be anomalous with respect to the baseline behavior, the control signal 129 may be sent back to the production system to allow remediation of the errant rule set if necessary or appropriate. In an embodiment, the anomalous behavior is not added to the behavior data 116 nor propagated to controlled system 130.

Figure 2:
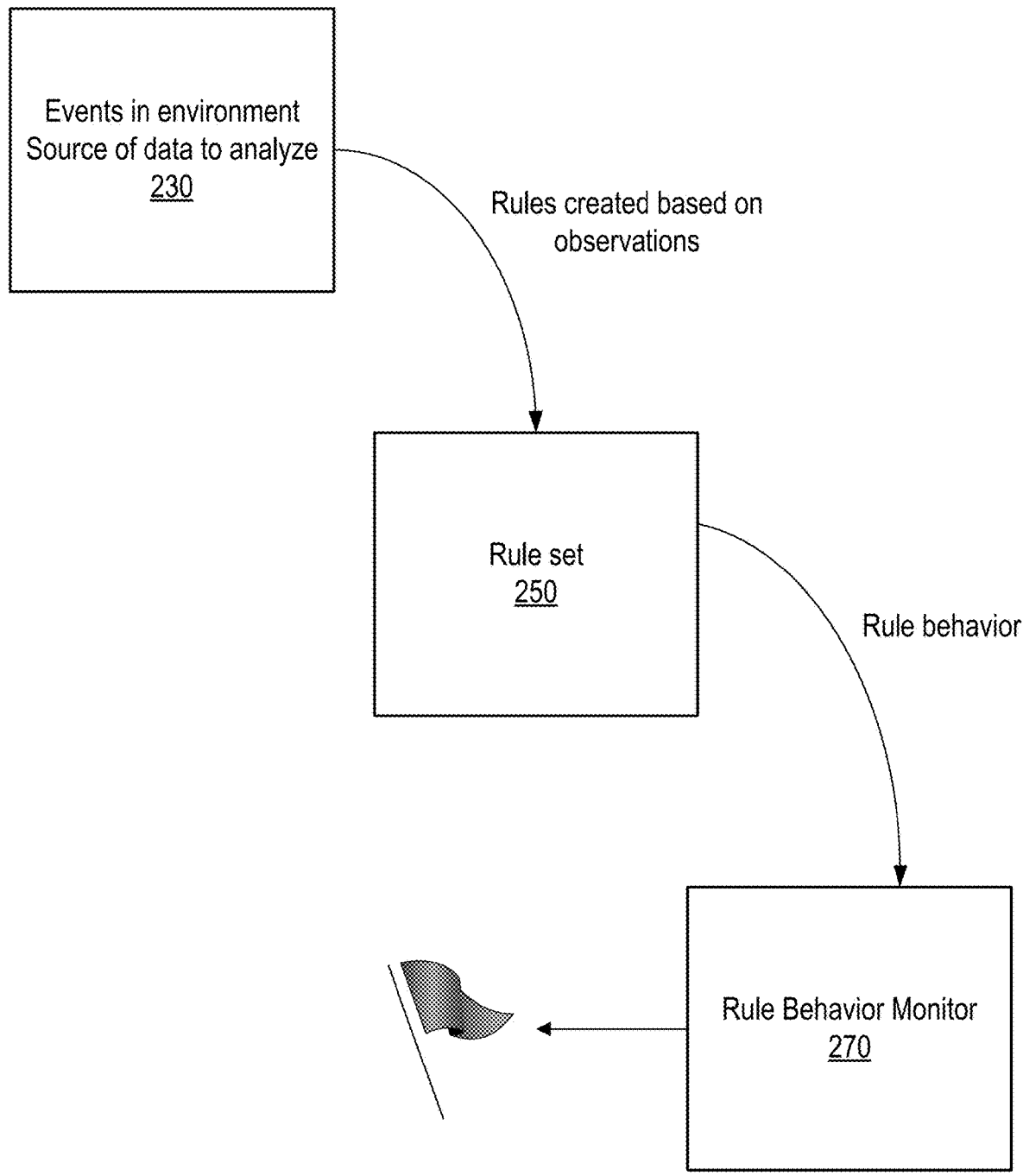
FIG. 2 illustrates a generalized overview of the operation of the invention, according to an embodiment of the invention.

FIG. 2 illustrates a generalized overview of the operation of the invention. Events occurring in a monitored environment 230 are recorded over time. For example, in a health diagnostic system, previous records of patient symptoms the corresponding doctor's diagnosis may be used as training data. Rules are constructed to attempt to predict the correct diagnosis for a set of symptoms. The accuracy of the resulting rules for predicting an outcome based on input data will be limited by the amount and variety of experiences represented in the training data.

Here is an example rule:
if pulse>=120 and 18<=blood pressure[6]<20 and temp>=104 and surgery duration<22 and clamp on artery and medication=EB45 and last medication>=60 and !white blood cell count [3]<-2.3 and !oxygen level [1]<-1.1→>>
then thromboembolism@prob<=0.65

The input data to be processed by this example rule includes condition indicators, for example: pulse=72, blood pressure=17, temperature=98.6; surgery duration=20, . . . etc.). These condition indicators may be represented training samples in the training database 214, as well as in the production data 125.

Rule set 250 represents a rule set that was created by observing the environment and evolved in that environment. Running in production, the rule set 250 uses the events from the production environment as input and generates an output.

Rule behavior monitor 270 receives the rule set's input and output upon applying production data and determines whether the behavior is significantly different than expected based on past behavior. When the current behavior is determined to be too different from the baseline behavior, the rule's behavior may be flagged as anomalous. An important point of the illustration in FIG. 2 is that rule behavior monitor 270 monitors the behavior of rules, not the behavior of humans.

Figure 3:
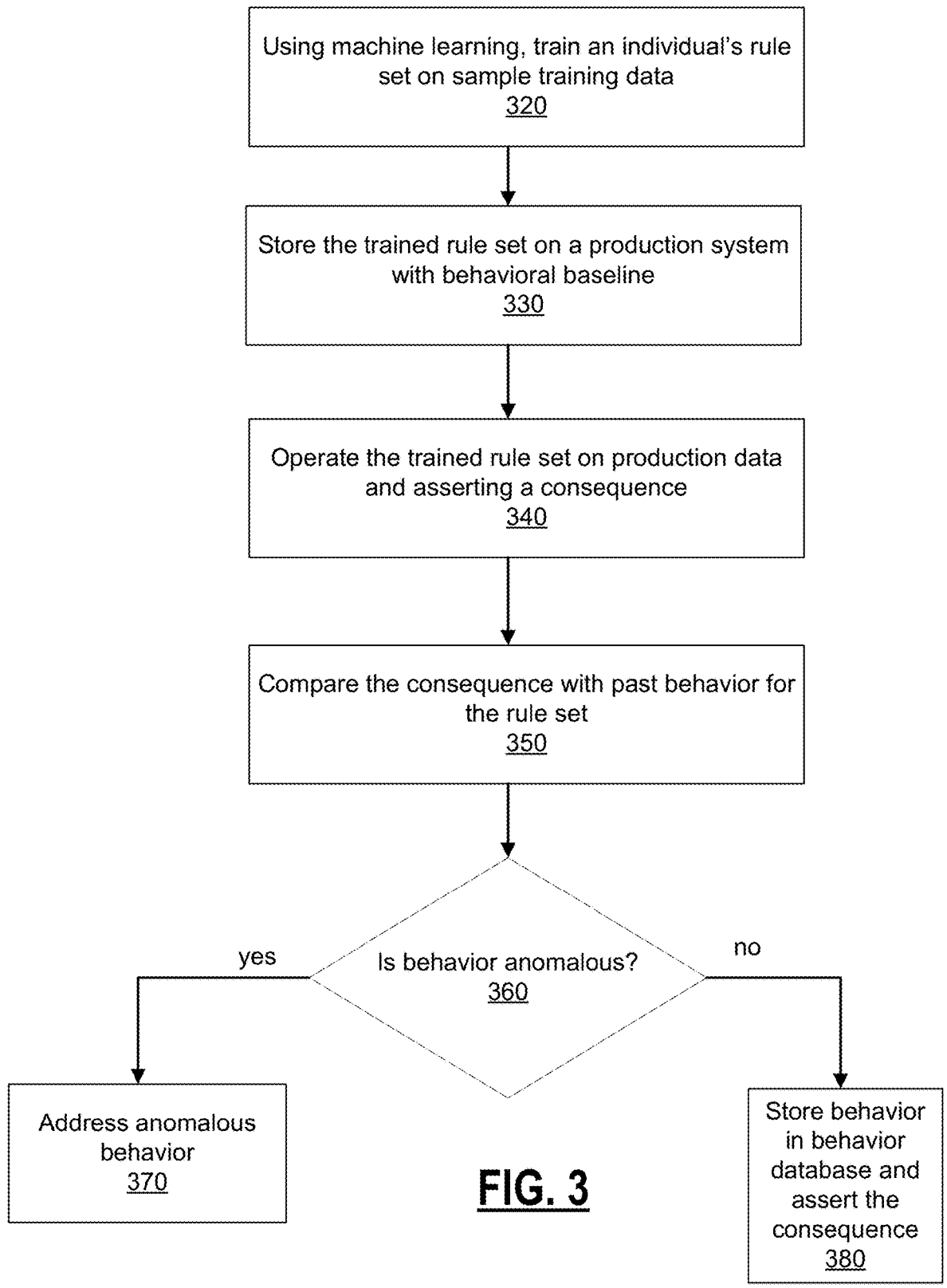
FIG. 3 is a flow diagram illustrating steps for identifying anomalous rule behavior, according to an embodiment of the invention.

FIG. 3 is a flow diagram illustrating steps for identifying anomalous rule behavior in a production environment, according to an embodiment of the invention. In Step 320, an individual's rule set is constructed by training against sample data in machine-learning environment. In Step 330, the trained rule set, having been subjected to a sufficient amount of training data and having demonstrated sufficient fitness is promoted into production and is stored for use in the production system. In Step 340, the promoted rule set receives production data as input, and when the input satisfies all of the conditions of at least one rule in the rule set, the rule set generates an output. In Step 350, the output along with the input data that triggered the rule to fire is compared against past behavior for the rule set stored in the behavior repository 116. In Step 360, a determination is made regarding whether the current behavior represents consistent or anomalous behavior. Note that because identification of anomalous behavior is an inexact science, in one embodiment it is not required that the determination of step 360 be always accurate. It is sufficient in such an embodiment merely that a determination be made. If the output is determined to be anomalous, then in Step 370, the deviant rule set or the effects of the output are addressed in some way. If the output is consistent with past behavior, then in step 380 the output may be added to the behavior data repository and the output may be sent to the control system where action indicated by the output may be performed.

Figure 4:
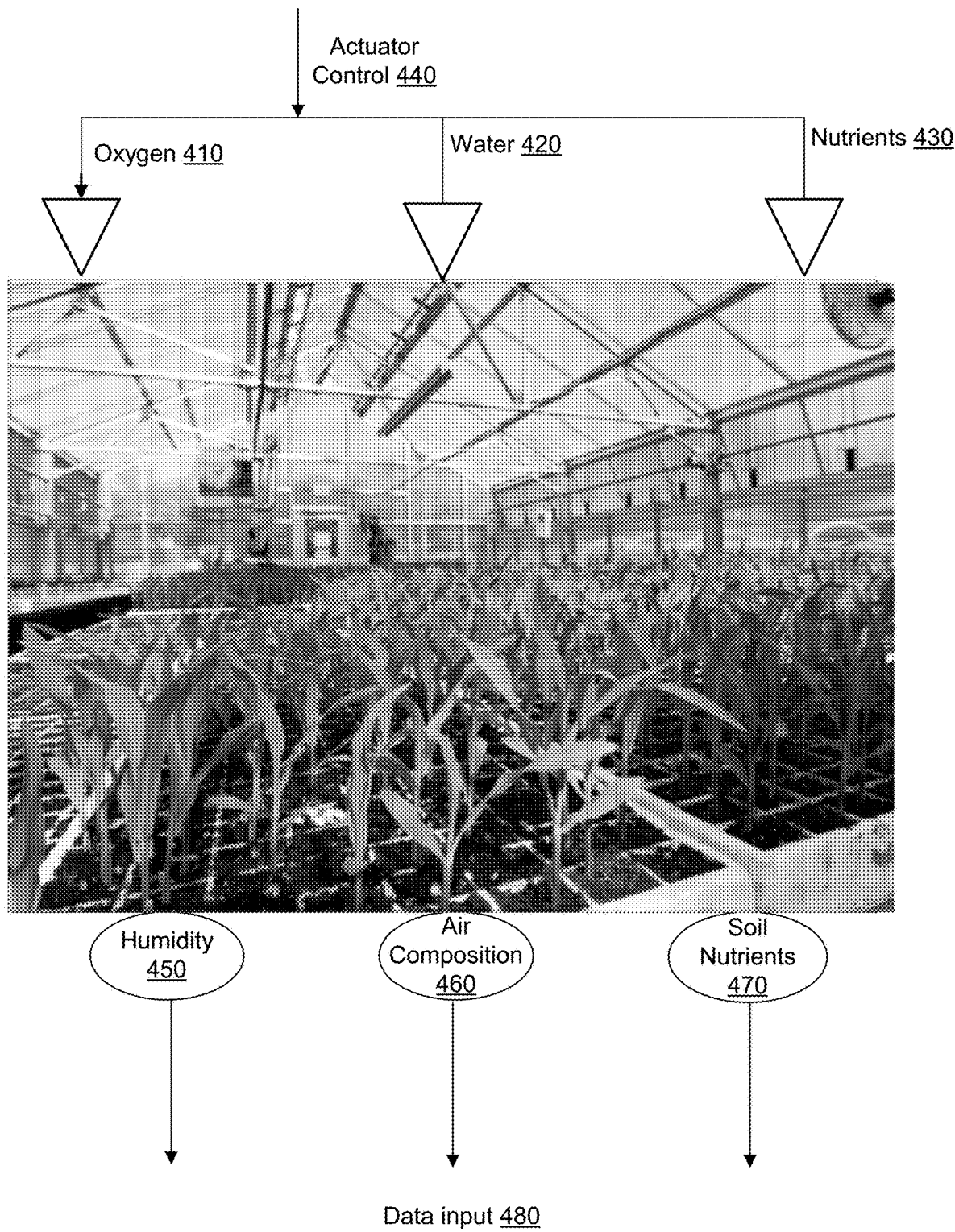
FIG. 4 is an illustration of a plant-growing control system involving aspects of the invention.

As an example, consider an automated plant growing production system as illustrated in FIG. 4. The controlled system includes actuators to turn on and off a light source, and pump oxygen (410), water (420), and nutrients (430) into a container of plants. Sensors within the container take measurements such as humidity of the soil and air (450), oxygen level (460), nutrient level of the soil (470), and size of one or more plants in the container (not illustrated in the figure). These measurements may be taken to determine whether a change to the environment is needed. Thus, the sensor data (460) may comprise the condition indicators of the input data processed by the production rules, and the output of the rules determine how to control the actuators (440). During the operation of the system, data may be recorded including the time of observation, input data from the sensors (amount of light since the previous observation, percent of each of humidity, oxygen, and nutrients in the air and soil, and average size of plants in the container) and output data such as the amount of each of oxygen, water, and nutrients added to the system in response to the sensor data along with the particular individual and rules within each individual that determined the output.

Observations may occur multiple times each day. The behavior model may be represented by aggregating the data from the multiple observations over a day's time such as the total amount of water added during the day. The behavior model may also include statistics aggregating data over a week's time such as the average growth of plants within the container.

When the recorded data is used as training data for establishing a behavioral baseline, the time condition indicator may be the time that a data point was originally observed, whereas the data input during production will be recorded with the time indication of when the observation took place in production. Time indications may be a timestamp which can be used to determine inter-observation time; the portion of the day such as morning, noon, or night; or an indication of the observation day in which the data should be aggregated.

The behavior database may store the production output to contribute to a moving baseline. In one embodiment, behavior for all days since the current set of seeds were planted may be used for comparison. In another embodiment, a configured number of the most recent days may be used. Thus, behavior can drift slowly as the plants grow. Behavior of the system that is considered normal when the plants are full grown may be quite different than when the plants are seedlings, but if the change happened gradually as the plants grow, the later behavior may not be considered anomalous.

There are many different ways to compare current behavior to a baseline. In an embodiment, the data recorded while processing the training data may be analyzed to derive the baseline statistics that characterize the system's normal behavior. For example, the normal behavior of the plant growing system may be characterized by the average number of hours of light per day and the average amount of water, oxygen, and nutrients added per day. The training data may include several observations for each day in an entire growing season, planting to harvest. The average behavior may be determined over the entire season, or may comprise a rolling average over a number of most recent days. Then a threshold of normalcy may be established based on a standard deviation of a day's observations relative to the average values.

In production, the same kind of data may be collected and the same kind of statistics may be generated. The time span over which the statistics are generated may be the same or shorter than the time span used to establish the baseline. For example, if the baseline is established over an entire growing season, the production data may be aggregated over a week's rolling average so that anomalous behavior may be detected and corrected before the end of the entire season.

In an example embodiment, when production statistics deviate from the baseline by two standard deviations as determined by the baseline, the behavior may be considered anomalous. Of course, other ways of determining and applying a threshold may be used.

A behavioral indicator represents a particular output value. In an embodiment, each behavioral indicator (amount of added light, water, oxygen, nutrients) may be individually compared to its baseline.

If the rolling average amount of water added to the system per day exceeds more than two standard deviations from the baseline average amount of water added per day, the system may be considered to be acting anomalously with respect to a water behavioral indicator. When such a deviation from the norm is discovered, a more fine-grained analysis may be performed to isolate the particular rules that fired causing too much or too little water to be added to the system.

In another embodiment, the behavior of each rule in each rule set may be determined more directly. The behavioral signature may be evaluated on a per rule basis when establishing the baseline and in production. Anomalous behavior may be detected for a single rule within a rule set by statistically comparing the output of each rule with the baseline output for that rule.

If each rule only outputs one behavioral indicator, then the evaluation of the behavior of a particular rule in production need only compare the rule behavior with respect to that single behavioral indicator. However, if a rule can affect more than one indicator, then a more sophisticated way of assessing the normalcy of production behavior may be needed. For example, a vector of behavioral indicators may be created to represent the behavior of a single rule within an individual's rule set on a single training sample. For example, for a vector v, $v[1]$=daily average amount of water added; $v[2]$=daily average amount of oxygen added, . . . etc. The baseline behavior may be represented by aggregating (e.g. a per-dimension average of) the vectors for all the training samples to create a single baseline behavior vector that characterizes the behavior on that collection of training samples. An aggregation (e.g. a per-dimension standard deviation) of the distance between each particular production behavior vector and the baseline behavior vector may be used to establish a distance threshold. The person of ordinary skill in the art will appreciate that there are many different ways to aggregate a set of vectors and a set of distance measures.

Euclidean Distance is an example of how to determine a distance between two vectors, but other calculations may be used, such as Manhattan distance.

In production, the behavior of each rule within each rule set may be similarly represented as a vector of behavior indicators. An average production behavior vector may be determined over the vectors representing the output of each observation during the considered time span, and a distance between the average production vector and the baseline behavior vector may be computed and compared to the threshold.

Detecting that an individual in production has exhibited anomalous behavior is based on measuring the distance of the production behavior vector from one or more vectors representing baseline behavior. When the measured distance exceeds a configured threshold, the current behavior is considered to be anomalous.

In another embodiment, the baseline data may be aggregated and represented by only one baseline behavior vector representing observations aggregated over all recorded observations or over a most recent portion of recorded observations. Distance between the production behavior vector and the one baseline behavior vector may be measured. Alternatively, separate baseline vectors may be created to store behavior over a single day. Thus, there may be one vector per day of observation, some subset of which may be used for determining the distance to the production behavior vector. For example, a medoid may be selected from among the baseline data. The distance between the production behavior vector and the medoid of the baseline vectors may be used as a measure of the distance.

There are several different ways that distance can be measured. In one embodiment, the distance between the current behavior vector and each of the baseline behavior vectors is determined and aggregated. For example, an average distance may be determined. The threshold may be determined by a function of the average pairwise distances among the baseline data.

In another embodiment, the distance between the production behavior vector and each other baseline vector, and the distance may be a function of the shortest and the longest distance among the pairwise distances.

A threshold may be determined in a number of ways as well. It may be a configured absolute number, a configured percentage of an aggregated mean, or a configured number of standard deviations, or any other way.

Note that whereas in most of the embodiments describe herein, the rule sets in the individuals are developed using an evolutionary algorithm. In other embodiments the rule sets can be developed using other machine learning algorithms. For instance, a classic Decision Tree algorithm will produce a set of declarative rules in the form of a tree. The behavior of each path in the tree can be analyzed over the training data to come up with the corresponding behavior vectors, and the techniques described herein can be used to detect anomalous operation in these kinds of individuals as well. Other examples will be apparent to the reader.

Computer Hardware

Figure 5:
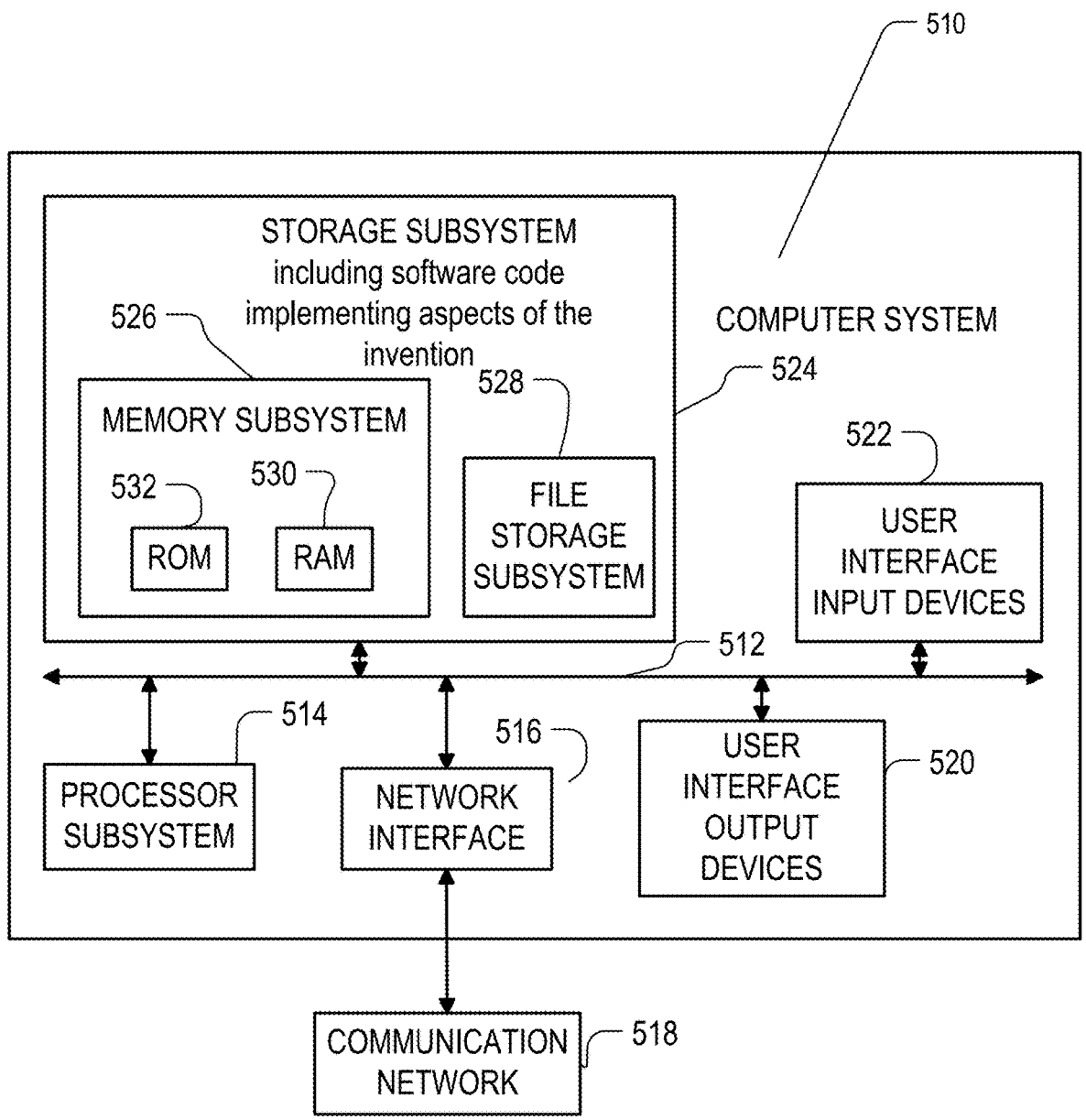
FIG. 5 is a simplified block diagram of a computer system that can be used to implement any or all of the embodiments.

FIG. 5 is a simplified block diagram of a computer system 510 that can be used to implement any or all of the embodiments of the invention. Computer system 510 typically includes a processor subsystem 514 which communicates with a number of peripheral devices via bus subsystem 512. These peripheral devices may include a storage subsystem 524, comprising a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks, including an interface to communication network 518, and is coupled via communication network 518 to corresponding interface devices in other computer systems. Communication network 518 may comprise many interconnected computer systems and communication links. These communication links may be wireline links, optical links, wireless links, or any other mechanisms for communication of information. While in one embodiment, communication network 518 is the Internet, in other embodiments, communication network 518 may be any suitable computer network or combination of computer networks.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 522 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 510 or onto computer network 518.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system. In particular, an output device of the computer system 510 on which production system 112 is implemented, may include a visual output informing a user of action recommendations made by the system, or may include a communication device for communicating action signals directly to the controlled system 130. Additionally or alternatively, the communication network 518 may communicate action signals to the controlled system 130.

Storage subsystem 524 stores the basic programming and data constructs that provide the functionality of certain embodiments of the present invention. For example, the various modules implementing the functionality of certain embodiments of the invention may be stored in storage subsystem 524. These software modules are generally executed by processor subsystem 514. Storage subsystem 524 also stores the candidate pool 118, training data 114, behavior data 116, or production individual population 122. Alternatively, one or more of such databases can be physically located elsewhere, and made accessible to the computer system 510 via the communication network 518.

Memory subsystem 526 typically includes a number of memories including a main random access memory (RAM) 530 for storage of instructions and data during program execution and a read only memory (ROM) 532 in which fixed instructions are stored. File storage subsystem 528 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 528. The host memory 526 contains, among other things, computer instructions which, when executed by the processor subsystem 514, cause the computer system to operate or perform functions as described herein. As used herein, processes and software that are said to run in or on "the host" or "the computer", execute on the processor subsystem 514 in response to computer instructions and data in the host memory subsystem 526 including any other local or remote storage for such instructions and data.

As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Bus subsystem 512 provides a mechanism for letting the various components and subsystems of computer system 510 communicate with each other as intended. Although bus subsystem 512 is shown schematically as a single bus, alternative embodiments of the bus subsystem may use multiple busses.

Computer system 510 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 510 depicted in FIG. 5 is intended only as a specific example for purposes of illustrating the preferred embodiments of the present invention. Many other configurations of computer system 510 are possible having more or less components than the computer system depicted in FIG. 5.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for detecting anomalous behavior of a computer-implemented machine learned rule-based individual operating in a production environment for controlling a system, the individual defining actions in accordance with one or more machine learned rules to assert in dependence upon input data, the method comprising:

representing a population of at least one individual electronically and storing the representation in a computer storage medium, each individual in the population identifying one or more actions to assert in dependence upon input data;

in a processor-implemented, machine learning training environment, testing a subject one of the individuals by applying a plurality of samples of training data containing known patterns of behavior;

for each sample of training data, monitoring one or more actions asserted by the subject individual in response to applying the sample training data, and recording in a behavior repository the one or more actions and output results corresponding to the sample training data;

developing a characterization of the subject individual's behavior in dependence upon the sample training data and corresponding one or more actions asserted by the subject individual during the training, wherein the characterization results in a rule set containing one or more machine-learned rules for asserting one or more actions by the subject individual in a production environment having production data containing unknown patterns of data, and further wherein the characterization includes expected output results from asserting the one or more actions;

in a production environment, operating the subject individual by applying the production data;

monitoring one or more production output results from the application of the production data to the subject individual's one or more machine-learned rules, including comparing production output results from the one or more actions taken with respect to the production data in accordance with the applied one or more machine-learned rules with the expected output results from the behavior repository to determine whether the subject individual's production behavior during operation is anomalous as compared to the subject individual's one or more actions recorded in the behavior repository corresponding to the sample training data;

wherein responsive to determining that the subject individual's production behavior is anomalous, performing at least one member of the group consisting of:

blocking the one or more actions asserted by the subject individual;

logging the one or more actions asserted by the subject individual;

removing the subject individual from the production environment;

raising an alert to cause independent validation of the one or more actions asserted by the subject individual; and raising an alert to cause ongoing monitoring of the subject individual's future asserted actions; and controlling the system using non-anomalous production output results, wherein the system is selected from the group consisting of a mechanical system, an electrical system and a computer system.

2. The method of claim 1, wherein the machine learning is based on a genetic algorithm.

3. The method of claim 1, wherein each input data and corresponding one or more actions stored in the behavior repository are represented using a vector, wherein developing a characterization of the subject individual's behavior comprises aggregating a plurality of the vectors in the behavior repository into a baseline behavior vector, and wherein monitoring one or more production output results comprises using a production behavior vector to represent the subject individual's production behavior, the production behavior vector identifying the production data and the corresponding one or more actions asserted by the subject individual in response to applying the production data.

4. The method of claim 3, further comprising, responsive to determining that the subject individual's production behavior is not anomalous, storing the production behavior vector in the behavior repository.

5. The method of claim 3, further comprising, responsive to determining that the subject individual's production behavior is not anomalous, updating the baseline behavior vector in dependence upon the production behavior vector.

6. The method of claim 3, wherein making a determination comprises determining a distance in vector space between the baseline behavior vector and the production behavior vector.

7. A system for detecting anomalous behavior of a computer-implemented machine learned rule-based individual operating in a production environment for controlling a system, the individual defining actions in accordance with one or more machine learned rules to assert in dependence upon input data, comprising:
- a computer readable storage medium having stored therein an electronic representation of a population of at least one individual, each individual in the population identifying one or more actions to assert in dependence upon input data;
- in a processor-implemented, machine learning training environment, a training processor and a non-transitory computer readable medium having stored therein in a non-transitory manner software code portions which when executed by the training processor:
- tests a subject one of the individuals by applying a plurality of samples of training data containing known patterns of behavior,
- for each sample of training data, monitors one or more actions asserted by the individual in response to applying the sample training data, and records in a behavior repository the one or more actions and output results corresponding to the sample training data,
- develops a characterization of the subject individual's behavior in dependence upon the sample training data and corresponding one or more actions asserted by the subject individual during the training, wherein the characterization results in a rule set containing one or more machine-learned rules for asserting one or more actions by the subject individual in a production environment having production data containing unknown patterns of data, and further wherein the characterization includes expected output results from asserting the one or more actions;
- in a processor-implemented, production environment, a production processor and a non-transitory computer readable medium having stored therein in a non-transitory manner software code portions which when executed by the production processor:
- operates the individual by applying the production data,
- monitors one or more production output results from the application of the production data to the subject individual's one or more machine-learned rules, including comparing production output results from the one or more actions taken with respect to the production data in accordance with the applied one or more machine-learned rules with the expected output results from the behavior repository to determine whether the subject individual's production behavior during operation is anomalous as compared to the subject individual's one or more actions recorded in the behavior repository corresponding to the sample training data;
- wherein the software code portions when executed by a processor, responsive to determining that the subject individual's production behavior is anomalous, further performs at least one member of the group consisting of:
- blocking the one or more actions asserted by the subject individual;
- logging the one or more actions asserted by the subject individual;
- removing the subject individual from the production environment;
- raising an alert to cause independent validation of the one or more actions asserted by the subject individual; and
- raising an alert to cause ongoing monitoring of the subject individual's future asserted actions; and
- controls the system using non-anomalous production output results, wherein the system is selected from the group consisting of a mechanical system, an electrical system and a computer system.

8. The system of claim 7, wherein the machine learning is based on a genetic algorithm.

9. The system of claim 7, wherein each input data and corresponding one or more actions stored in the behavior repository are represented using a vector,
- wherein developing a characterization of the subject individual's behavior comprises aggregating a plurality of the vectors in the behavior repository into a baseline behavior vector, and
- wherein monitoring one or more output production results comprises using a production behavior vector to represent the subject individual's production behavior, the production behavior vector identifying the production input data and the corresponding one or more actions asserted by the subject individual in response to applying the production input data.

10. The system of claim 9, further comprising, responsive to determining that the subject individual's production behavior is not anomalous, storing theproduction behavior vector in the behavior repository.

11. The system of claim 9, further comprising, responsive to determining that the subject individual's production behavior is not anomalous, updating thebaseline behavior vector in dependence upon the production behavior vector.

12. The system of claim 9, wherein making a determination comprises determining a distance in vector space between the baseline behavior vector and the production behaviorvector.

* * * * *